(12) United States Patent
Lin

(10) Patent No.: US 11,178,557 B2
(45) Date of Patent: Nov. 16, 2021

(54) FUNCTION SLICING OF WIRED AND WIRELESS NETWORK RESOURCES

(71) Applicant: North Carolina State University, Raleigh, NC (US)

(72) Inventor: Shih-Chun Lin, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 16/875,246

(22) Filed: May 15, 2020

(65) Prior Publication Data

US 2020/0367072 A1  Nov. 19, 2020

Related U.S. Application Data

(60) Provisional application No. 62/849,429, filed on May 17, 2019.

(51) Int. Cl.
*H04W 24/02* (2009.01)
*H04W 28/02* (2009.01)
*H04W 16/02* (2009.01)

(52) U.S. Cl.
CPC ........... *H04W 24/02* (2013.01); *H04W 16/02* (2013.01); *H04W 28/0289* (2013.01)

(58) Field of Classification Search
CPC . H04L 41/08; H04L 41/0803; H04L 41/0806; H04L 41/0823–0836; H04L 41/0896; H04L 47/78; H04L 47/82; H04W 16/02–12; H04W 24/02; H04W 24/04
See application file for complete search history.

(56) References Cited

U.S. PATENT DOCUMENTS

| | | | |
|---|---|---|---|
| 10,091,093 B2 | 10/2018 | Luo et al. | |
| 10,153,974 B2 | 12/2018 | Luo et al. | |
| 2017/0245179 A1* | 8/2017 | Callard | H04W 24/04 |
| 2017/0302580 A1* | 10/2017 | Luo | H04L 41/0896 |
| 2018/0351652 A1* | 12/2018 | Ashrafi | H04L 41/08 |
| 2020/0196194 A1* | 6/2020 | Kozat | H04L 41/0806 |

OTHER PUBLICATIONS

Forsgren et al. "Interior Methods for Nonlinear Optimization", SIAM Review 2002 Society for Industrial and Applied Mathematics, vol. 44, No. 4, pp. 525-597.
Huang et al. "Delay Reduction via Lagrange Multipliers in Stochastic Network Optimization", IEEE Transactions on Automatic Control, vol. 56, No. 4, Apr. 2011.

(Continued)

*Primary Examiner* — Pao Sinkantarakorn
(74) *Attorney, Agent, or Firm* — Thomas | Horstemeyer, LLP

(57) ABSTRACT

Disclosed are various embodiments for realizing cross-domain (wireless radio and wired core networks) and cross-layer (physical, media access control, and network) functionalities for multi-service converged 5G and beyond (5G&B) infrastructure. A virtual network can be determined that slices across domains and layers of a communication network. Data flow rates and routing solutions for the virtual network can be determined. Examples of controlling resources of a software-defined network (SDN) to achieve the data flow rates and the routing solutions are provided.

20 Claims, 8 Drawing Sheets

(56) References Cited

OTHER PUBLICATIONS

Eryilmaz et al. "Joint Congestion Control, Routing, and MAC for Stability and Fairness in Wireless Networks", IEEE Journal on Selected Areas in Communications, vol. 24, No. 8, Aug. 2006.

Mo et al. "Fair End-to-End Window-Based Congestion Control", IEEE/ACM Transactions on Networking, vol. 8, No. 5, Oct. 2000.

Liu et al., "Joint Congestion Control and Routing Optimization:An Efficient Second-Order Distributed Approach", IEEE/ACM Transactions on Networking, vol. 24, No. 3, Jun. 2016.

Lin et al. "Towards Optimal Network Planning for Software-Defined Networks", IEEE Transactions on Mobile Computing, vol. 17, No. 12, Dec. 2018.

Mijumbi et al. "Network Function Virtualization: State-of-the-Art and Research Challenges" IEEE Communications Surveys & Tutorials, vol. 18, No. 1, First Quarter 2016.

Akyildiz et al. "5G roadmap: 10 key enabling technologies", Computer Networks 106 (2016) 17-48.

Yap et al. "Blueprint for Introducing Innovation into Wireless Mobile Networks", VISA 2010, Sep. 3, 2010, New Delhi, India, Copyright 2010 ACM 978-1-4503-0199—Feb. 10, 2009.

Cheng et al. "Joint Network Optimization and Downlink Beamfomiing for CoMP Transmissions Using Mixed Integer Conic Programming", IEEE Transactions on Signal Processing, vol. 61, No. 16, Aug. 15, 2013.

C-RAN "The Road Towards Green RAN", White Paper, Version 2.5 (Oct. 2011).

Lin "End-to-End Network Slicing for 5G&B Wireless Software-Defined Systems", Intelligent Wireless Networking Lab, Department of Electrical and Computer Engineering, North Carolina State University, Raleigh, NC 27695, USA, 2018.

Akyildiz et al. "SoftAir:A software defined networking architecture for 5G wireless systems", Computer Networks 85 (2015) 1-18.

* cited by examiner

Algorithm 1: Fast Network Resource Slicing (FNRS).

Input: Utility-optimal problem in Eq. (6) and $\epsilon > 0$.
Output: $\lambda_f^*, z_f^{l*}, \forall f \in F, l \in \mathcal{L}; p^{l*}, \forall l \in \mathcal{L}_{AD}$.

1 set initial values for $\lambda_f, z_f^l, \bar{y}_f^l, \forall i \neq d_f, f \in F, l \in \mathcal{L};$
   $p^l, \forall l \in \mathcal{L}_{AD}, \bar{y}_i^p, \forall i \in \mathcal{B}$. %Initialization
2 do
3       compute $\bar{y}^{m+1}$ using Eq. (15).
4       obtain $\Delta y^m = \bar{y}^{m+1} - y^m$ and $\Delta x^m$ via Eq. (14).
5       update $x^{m+1}$ and $y^{m+1}$ jointly via Eq. (11).
6 while *a predefined runtime is not reached or the Newton decrement criterion is not satisfied;*

FIG. 2A

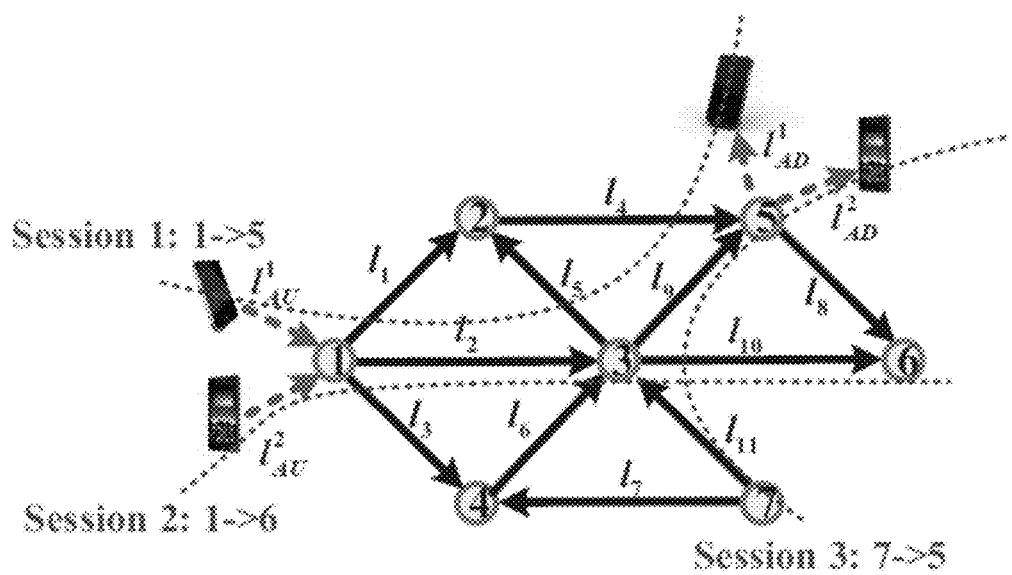

FIG. 2B

(a) Source rate $\lambda_2$.

(b) Objective value.

FUNCTION SLICING OF WIRED AND WIRELESS NETWORK RESOURCES

CROSS-REFERENCE TO RELATED APPLICATION

This application claims priority to and the benefit of, U.S. Provisional Application No. 62/849,429, filed on May 17, 2019, entitled "FUNCTION SLICING OF WIRED AND WIRELESS NETWORK RESOURCES," the entire contents of which is hereby incorporated herein by reference.

BACKGROUND

The search for higher data rates, lower end-to-end latency, and enhanced quality-of-service in communication networks has led to improvements such as software-defined cellular architectures. These approaches can provide virtual networks that share physical infrastructure and provide a powerful framework for high-level resource utilization, service performance guarantees, and cross-technology functionality optimization (or improvement) that significantly reduces capital and operational expenses. However, for network virtualization to slice wireless and wired resources, existing hardware-based wireless networks with inflexible radio access and core architectures impose significant challenges. Software-defined cellular architectures can address some of these challenges, for example by decoupling the control message plane from the user data plane, abstracting the network, and providing programmability. An efficient virtualization solution is needed for slicing functionalities in both radio access and core networks to ensure optimal data throughput and congestion-free systems.

BRIEF DESCRIPTION OF THE DRAWINGS

For a more complete understanding of the embodiments and the advantages thereof, reference is now made to the following description, in conjunction with the accompanying figures briefly described as follows:

FIG. 2A illustrates a procedure for fast network resource slicing (FNRS) according to various embodiments of the present disclosure.

FIG. 2B illustrates three data sessions with two sending user equipment (UE) devices (UEs) in an uplink SD-RAN, seven nodes in a software-defined core network (SD-CN), and two receiving UEs in a downlink SD-RAN according to various embodiments of the present disclosure.

Figure 1:
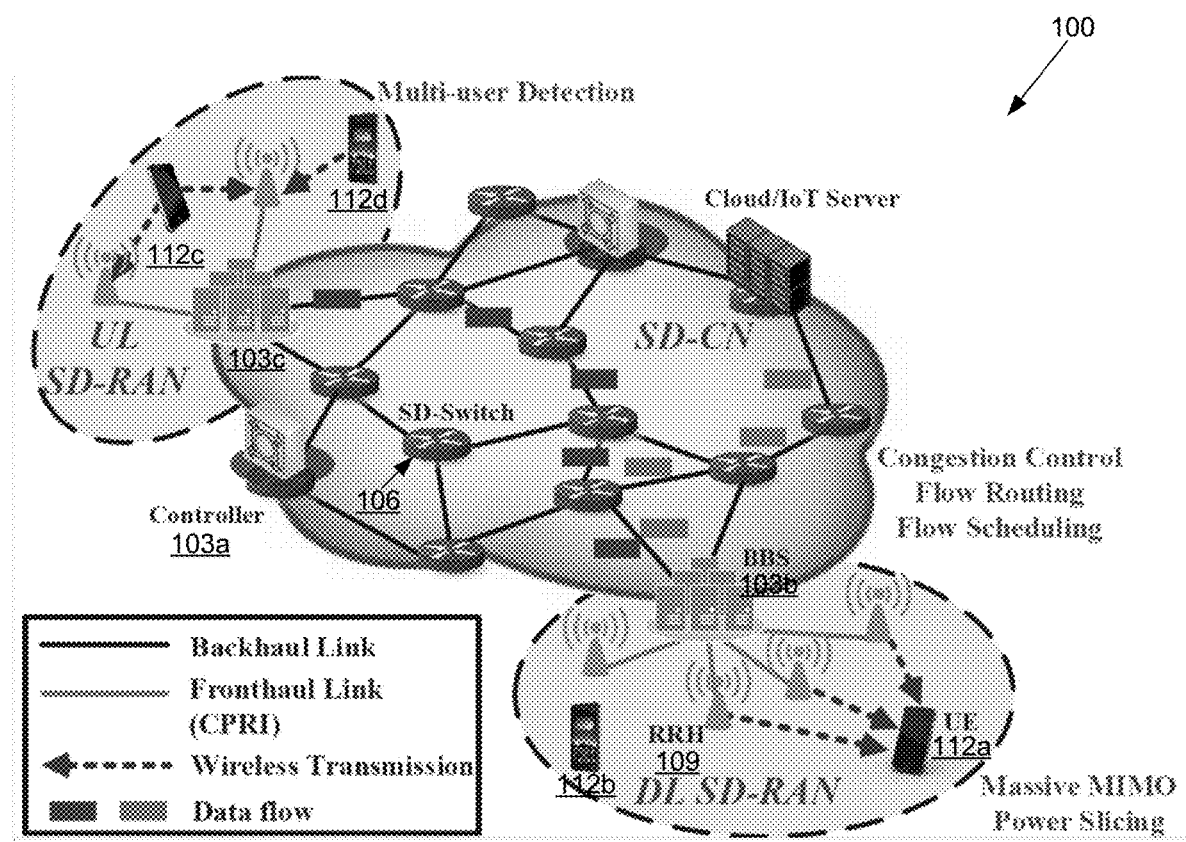
FIG. 1 illustrates an end-to-end virtualization framework including end-to-end data flows along with communication functionalities according to various embodiments of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Fast network resource slicing (FNRS) is disclosed herein that can jointly consider congestion control, flow routing, and power slicing in wired and wireless network resources to improve or maximize the total incoming rates of wireless/wired flows, while satisfying flow-queue stability and system-level constraints. Given a software-defined cellular architecture such as the SoftAir architecture as described by I. F. Akyildiz, P. Wang, and S.-C. Lin in "SoftAir: A software defined networking architecture for 5G wireless systems," *Computer Networks*, vol. 85, pp. 1-18, 2015, a network utility problem can be formulated that jointly studies end-to-end, fine-grained, and dynamic resource slicing. FNRS provides end-to-end network slicing for 5G and beyond (5G&B) wireless systems that achieves enhanced or optimal policies for congestion control, flow routing, and power slicing.

In some examples, a method is provided. The method includes identifying network controllers, baseband servers (BBSs), or other control units of a software defined cellular architecture associated with a communication network. The method can determine a virtual network for data flow across the communication network, where the virtual network slices across domains and across layers of the communication network. The method determines or finds convergence within a predetermined number of iterations of an iterative optimization problem in which each iteration comprises a quadratic objective for utility of the virtual network. The optimization problem further includes at least one linear constraint(s) for congestion control, flow routing, and flow scheduling of the virtual network, or a linear constraint for power slicing of the BBSs. The method also determines or finds enhanced or optimal data flow rates and routing solutions for the virtual network to realize, achieve, improve, or maximize a total data flow rate, where the total data flow includes incoming flows from wired resources associated with the network controllers and wireless resources associated with the BBSs. Further, the method includes controlling the control units to achieve the enhanced or optimal data flow rates and routing solutions.

In other examples, a system is provided. The system includes at least one application, such as a control application, that causes a computing device to identify wired and wireless resources associated with a communication network. The at least one application determines a virtual network for data flow across the communication network, where the virtual network slices across the wired and the wireless resources of the communication network. The at least one application determines or finds convergence within a predetermined number of iterations of an iterative optimization problem in which each iteration comprises a quadratic objective for utility of the virtual network. The optimization problem further includes at least one linear constraint(s) for congestion control, flow routing, and flow scheduling of the virtual network, or a linear constraint for power slicing of the wireless resources. The at least one application finds enhanced or optimal data flow rates and routing solutions for the virtual network to realize, achieve, improve, or maximize a total data flow rate comprising incoming flows from the wired and the wireless resources. The control application also controls the wired and the wireless resources to achieve the enhanced or optimal data flow rates and routing solutions.

In the disclosed concept, it is understood that a number of technical problems exist with regard to use of network virtualization as enabling technologies for 5G&B communication networks. Conventional network virtualization approaches can involve virtualization of a particular domain (such as wireless radio or wired core networks) or a particular layer (such as physical, media access control, or network). Merely decoupling the control message plane from the user data plane in a communication network does not for example recognize transmit power of base stations as a wireless asset or achieve resource-efficient virtualization in downlink software-defined radio access networks (SD-RANs), among other things. The methods, systems, and computer-readable mediums disclosed herein can solve one or more technical problems by providing fast network resource slicing (FNRS) that determines at least one virtual network for data flow across a communication network, where the at least one virtual network slices across domains and across layers of the communication network. The disclosure further solves a technical problem by controlling control units to achieve optimal or enhanced data flow rates and routing solutions.

Introduction

The emerged demands for higher data rates, lower end-to-end latency, enhanced quality-of-service for end users, the exponential growth of multimedia applications and service diversity, and the heterogeneity of massive mobile device have brought very strict requirements for 5G&B wireless systems. For example, system goals of an ultra-high data rate can involve supporting a 100-fold improvement in user-experienced throughput, targeting 10 Gbps peak rates and 100 Mbps cell edge rates. The user-plane (end-to-end) latency can be less than 1 ms, and the differentiated networking capabilities can sometimes be provided over the same infrastructure for 1000 times cost efficiency. Among enabling technologies to meet 5G&B requirements, network virtualization has great potential. It can actively share the physical infrastructure, providing an opportunity for high-level resource utilization, service performance guarantees, and cross-technology functionality optimization, and significantly reduces capital and operational expenses. However, for this virtualization technology to slice wireless and wired resources, existing hardware-based wireless networks with inflexible radio access and core architectures impose significant challenges.

To address the problems involved with hardware-based, closed, and inflexible network architectures, software-defined networking has appeared. It decouples the control message plane from the user data plane, and efficiently creates centralized network abstraction with the programmability provisioning over the entire network. Examples of a wireless architecture and features for applying software-defined networking to wireless domains are described by I. F. Akyildiz, P. Wang, and S.-C. Lin in "SoftAir: A software defined networking architecture for 5G wireless systems," Computer Networks, vol. 85, pp. 1-18, 2015, which is incorporated by reference herein in its entirety. SoftAir is introduced to enable flexible architectural and algorithm designs. SoftAir brings the centralized, decoupling architecture that can allow global optimized control with respect to real-time network status. Its openness and programmability facilitates the ubiquity and flexibility of policy designs in various platforms. It does not appear to provide an efficient virtualization solution for slicing both wireless and wired resources at the same time.

The present disclosure facilitates innovative end-to-end network slicing, which can jointly improve or optimize a plurality of cross-layer functionalities in access and/or core networks for enhanced or optimal data throughput and congestion-free systems. The SoftAir architecture can separate network software functions from physical hardware devices for access and core networks, and introduces dedicated control units, e.g., high-level network controllers and BBSs, that can manage some or all of the system. First, the idea and important designs of end-to-end virtualization that can simultaneously orchestrate wired and wireless infrastructure as a service are introduced. The stochastic utility-optimal virtualization problem, which can jointly improve or optimize the policies of congestion control, flow routing, and power slicing for data flows, is formulated. The objective is to improve or maximize the achievable total incoming rates of wireless/wired flows while guaranteeing the flow-queue stability and system-level constraints with respect to (i) maximum BBS transmit power, (ii) end-to-end flow conservation, and/or (iii) wireless/wired link capacities.

After transforming the virtualization problem into the corresponding deterministic form, this disclosure describes a procedure including an iterative primal-dual fast network resource slicing (FNRS) algorithm to obtain enhanced or optimal solutions in cross-domain (wireless radio and wired core networks), cross-layer (physical, media access control, network, or other suitable layer) functionalities for multi-service converged infrastructure. By successively exploiting an interior-point method with Newton techniques, primal- and dual-updating rules are derived, which can be executed by control units to achieve resource-efficient virtualization with quadratic convergence rate. Performance analysis confirms that the disclosed procedure including the FNRS algorithm can ensure congestion-free networks with bounded flow queues and/or achieve enhanced or optimal flow utilities with second-order speed. Numerical results validate the time-efficiency and adaptiveness of the disclosed FNRS to time-varying link conditions.

This disclosure appears to be the first to develop fast end-to-end network slicing via software-defined architectures, which can improve or optimize the total utility of data flows with congestion-free networks and achieve end-to-end, fine-grained, and dynamic virtualization for 5G&B systems.

System Model

A. Software-Defined Cellular Architecture

SoftAir, a wireless software-defined architecture, has been recognized as an integrated solution of Cloud-RAN and CoMP (coordinated multi-point). As shown in FIG. 1, an end-to-end virtualization framework 100 including end-toend data flows along with communication functionalities can be provided according to various embodiments of the present disclosure. Portions of the end-to-end virtualization framework 100 can be implemented using a software-defined cellular architecture, SoftAir, or any suitable software-defined network. The end-to-end virtualization framework 100 can comprise a software-defined core network (SD-CN), software-defined RANs (SD-RANs), and one or more control units (also referred to herein as a control unit 103 or control units 103, e.g., a network controller 103a, a BBS 103b, and/or a BBS 103c). The SD-CN comprises one or more network controllers 103a with management tools and customized applications, and software-defined switches 106 (also referred to herein as SD-Switches 106) as an open, programmable, virtualizable forwarding infrastructure. SD-RANs have (i) the centralized pool of BBS 103b, 103c, which connects to the SD-CN via backhaul links, (ii) one or more remote radio head (RRH) (also referred to herein as RRH 109, or RRHs 109) equipped with multiple antennas, which are remotely controlled by BBSs 103b, 103c and serve one or more user equipment (UE) devices (also referred to herein as a UE 112 or UEs 112, e.g., UEs 112a . . . 112d), and (iii) low-latency high-bandwidth fronthaul links using common public radio interface (CPRI) or other suitable interface used to carry data for an accurate, high-resolution synchronization among RRHs 109. Let $F$, $\mathcal{L}$, and $\mathcal{B}$ denote the sets of data flows with randomness, communication links, and BBSs 103b, 103c, respectively. There exists N nodes, including some or all UEs 112, BBSs 103b, 103c, and SD-Switches 106. Moreover, by considering frequency-division duplexing (FDD) wireless transmissions in SD-RANs, $\mathcal{L} \triangleq \mathcal{L}_C \cup \mathcal{L}_{\mathcal{A}U} \cup \mathcal{L}_{\mathcal{A}D}$, where $\mathcal{L}_C$, $\mathcal{L}_{\mathcal{A}U}$, and $\mathcal{L}_{\mathcal{A}D}$ denote the link sets in the SD-CN, uplink SD-RANs, and downlink SD-RANs, respectively.

Notations: Throughout this paper, bold uppercase and lowercase letters denote matrices and vectors, respectively. $\mathbb{R}$ denotes the set of real numbers. $\mathbb{E}[\cdot]$ denotes the expectation operator. $x^T$, $x^H$, $\|x\|$ and $\|x\|_2$ represent the transpose, Hermitian, $L^1$- and $L^2$-norms of vector x, respectively. $\mathrm{Diag}(x_1, \ldots, x_N)$ denotes the block diagonal matrix with $x_1, \ldots, x_N$ on its main diagonal; $\mathrm{diag}(A)$ denotes the vector containing the main diagonal entries of A. $\mathrm{eig}_{min}(A)$ and $\mathrm{eig}_{max}(A)$ denote the smallest and largest eigenvalues of A, respectively.

B. End-to-End Virtualization Framework

By leveraging the openness and programmability of SoftAir architectures, this disclosure introduces an end-to-end virtualization framework 100 that offers the wireless/wired hardware infrastructure as a service, and slices network resources for multiple virtual networks so that they can simultaneously share the same physical network architecture. The virtualization (e.g., at least one virtual network) can traverse the SD-RANs and the SD-CN and realize multi-service converged 5G&B infrastructure. As shown in FIG. 1, control units 103 comprising BBSs 103b, 103c (as local RAN control units) and one or more controllers 103a (e.g., high-level network controllers) can jointly manage and orchestrate physical-, media access control-, or network-layer (or other suitable layer) functionalities to improve or increase the average incoming rates of data flows, while maintaining a congestion-free system. Take an end-to-end data flow as an example. In the uplink SD-RAN shown in FIG. 1, multi-user detection can be performed to distinguish data transmitted by UE 112c and/or UE 112d; in the downlink SD-RAN, examples of the massive multi-input multi-output (MIMO) technique and power slicing for supporting efficient downlink transmissions can be implemented. Also, congestion control, flow routing and flow scheduling policies for the system can be implemented as discussed herein.

Problem Formulation and Transformation

A. Functionality Designs
1) Uplink SD-RANs

Given BBS 103c $i \in \mathcal{B}$ and several UEs 112 $\{j; \forall (j,i) \in \mathcal{L}_{\mathcal{A}U}\}$ in an uplink SD-RAN, consider multi-user detection at the BBS 103c as follows. While each BBS 103c can coordinate a plurality of RRHs 109 via fronthaul links, BBS 103c $i \in \mathcal{B}$ receives the signal vector from serving UEs 112 (e.g., UE 112c and UE 112d) at time t as $$y_i^{ul}(t) = \sqrt{p^{ul}(t)} \sum_{j=1}^{|(j,i) \in \mathcal{L}_{\mathcal{A}U}|} h_j^{ul}(t) x_j^{ul}(t) + \eta^{ul}(t) \quad (1)$$

$$= \sqrt{p^{ul}(t)} H_i^{ul}(t) x_i^{ul}(t) + \eta^{ul}(t),$$

where $p^{ul}(t)$ denotes the uplink transmit power of each UE 112, $H_i^{ul}(t) = [h_j^{ul}(t); (j,i) \in \mathcal{L}_{\mathcal{A}U}]$ and $x_i^{ul}(t) = [x_j^{ul}(t); (j,i) \in \mathcal{L}_{\mathcal{A}U}]$ respectively denote the channel coefficient matrix and the transmitted signal vector from UE 112c and UE 112d to BBS 103c i, and $\eta^{ul}(t)$ denotes the zero-mean circularly symmetric Gaussian noise with noise power $\sigma^2$. Assume that BBS 103c (or multiple BBSs 103c) adopts a linear detection scheme to separate the received signal into user streams. Specifically, given $R_i(t) = [r_j(t); (j,i) \in \mathcal{L}_{\mathcal{A}U}]$ as the linear detection matrix used by BBS 103c i, the detected signal at the BBS 103c can be yielded as $\tilde{y}_i^{ul}(t) = R_i^H(t) y_i^{ul}(t)$, where the signal from UE 112 j (e.g., UE 112c or UE 112d) can be calculated as $\tilde{y}_i^{ul,j}(t) = \sqrt{p^{ul}(t)} r_j^H(t) h_j^{ul}(t) x_j^{ul}(t) + r_j^H(t) \eta^{ul}(t) + \sqrt{p^{ul}(t)} \sum_{k=1, \neq j}^{\{(k,i) \in \mathcal{L}_{\mathcal{A}U}\}} b r_j^H(t) h_k^{ul}(t) x_k^{ul}(t)$. This implies that the signal-to-interference-plus-noise ratio (SINR) of wireless link (j,i) can be given by $$\gamma_{ul}^{(j,i)}(t) = \frac{|r_j^H(t) h_j^{ul}(t)|^2 p^{ul}(t)}{|r_j^H(t) r_j(t)|^2 \sigma^2 + \sum_{k=1, \neq j}^{\{(k,i) \in \mathcal{L}_{\mathcal{A}U}\}} |r_j^H(t) h_k^{ul}(t)|^2 p^{ul}(t)}.$$

If matched filter or maximum ratio combining is adopted by BBS 103c i, the detection matrix can be the estimated channel matrix, e.g., $R_i(t) = H_i^{ul}(t)$, including when it is assumed that there are no estimation errors. Finally, the uplink capacity can be formulated as the ergodic achievable rate, e.g., $\mu^{(j,i)}(t) = \log_2(1 + \gamma_{ul}^{(j,i)}(t))$, $\forall (j,i) \in \mathcal{L}_{\mathcal{A}U}$ $i \in \mathcal{B}$.

Downlink SD-RANs: Regarding downlink transmissions from BBS 103b $i \in \mathcal{B}$ to UEs 112 $\{j; (i,j) \in \mathcal{L}_{\mathcal{A}D}\}$ (e.g., UE 112a and UE 112b), it can be assumed additive white Gaussian noise (AWGN) channels. Given the linear precoding vector for UE 112 j as $w_j(t)$, the UE 112 (e.g., UE 112a or UE 112b) receives the signal as $$y_j^{dl}(t) = h_j^{dlH}(t) w_j(t) \sqrt{p^{ij}(t)} x_j^{dl}(t) + \eta_j^{dl}(t) +$$

$$\sum_{k=1, \neq j}^{\{(k,i) \in \mathcal{L}_{\mathcal{A}U}\}} h_j^{dlH}(t) w_k(t) \sqrt{p^{ik}(t)} x_k^{dl}(t),$$

where $p^{ij}(t)$ denotes the downlink transmit power from BBS 103b i to UE 112j. Additionally, matched filter beamforming can be adopted here by simply setting $w_j(t)=h_j^{dl}(t)$. With noise power $\sigma^2$, the SINR can be given by $$\gamma_{dl}^{(i,j)}(p^{ij}(t)) = \frac{|h_j^{dlH}(t)w_j(t)|^2 p^{ij}(t)}{\sigma^2 + \sum_{k=1,\neq j}^{\{(i,k)\in\mathcal{L}_{\mathcal{AD}}\}} |h_j^{dlH}(t)w_k(t)|^2 p^{ik}(t)}.$$

Thus, one can obtain the downlink capacity as follows:

$$\forall i \in \mathcal{B}, (i,j) \in \mathcal{L}_{\mathcal{AD}},$$

$$\mu^{(i,j)}(p^{ij}(t)) = \log_2\left(1 + \gamma_{dl}^{(i,j)}(p^{ij}(t))\right) \approx \log_2\left(1 + \frac{|h_j^{dlH}(t)h_k^{dl}(t)|^2}{\sigma^2} p^{ij}(t)\right),$$

where the approximation can come from the design of massive MIMO technique. Massive MIMO can include a BBS 103b, 103c or other suitable resource, for example, that utilizes more than eight antennas (and sometimes as many as 128, 256, or more), and can also include UEs 112 that utilize around eight antennas. Particularly, in the case of a sufficiently large number of RRHs 109 in each BBS 103b, the rows of channel coefficient matrix can be nearly orthogonal, e.g., $h_j^{dlH}(t)w_k(t)=h_j^{dlH}(t)h_k^{dl}(t)\approx 0$, $\forall k\neq j$.

This disclosure also considers innovative power slicing for wireless virtualization in downlink SD-RANs. This idea recognizes transmit power of base stations (e.g., BBS 103b and/or BBS 103c) as a wireless asset and enables simultaneous usages of sliced power by isolated parties. An example of power slicing with respect to radio access technologies is given in K.-K. Yap and et al., "Blueprint for introducing innovation into wireless mobile networks," in *Proceedings of the Second ACM SIGCOMM Workshop on Virtualized Infrastructure Systems and Architectures*, New York, N.Y., USA, 2010, pp. 25-32, which is incorporated by reference herein in its entirety. Specifically, the present disclosure can provide power virtualization of BBS 103b with respect to serving downlink UEs 112 as follows. Given $p^{max}$ as the improved or maximum transmit power of a plurality of BBSs 103b, the total downlink power usage of each BBS 103b can be no greater than the maximum power. That is, $$\sum_{(i,j)\in\mathcal{L}_{AD}} p^{ij}(t) \leq P^{max}, \forall i \in \mathcal{B}, \quad (2)$$

allowing the fine-grained slicing for enhanced or optimal power utilization.

3) The System

To realize at least one virtual network for end-to-end network virtualization, this disclosure also investigates several functionalities over the system of the end-to-end virtualization framework 100 as follows. First, the congestion control can be considered to improve or maximize incoming rates of supportable data flows, while ensuring the fairness among flows. Specifically, given $\lambda_f(t)$ as the incoming rate of flow f at time t and $\lambda_f=\lim_{T\to\infty}\Sigma_{t=0}^{T-1}\lambda_f(t)/T$ as the time-average rate, this disclosure introduces utility functions $U_f(\lambda_f): \mathbb{R}_+ \to \mathbb{R}$, $\forall f \in F$ that can be (or should be) continuous, strictly concave, and monotonically nondecreasing and twice continuously differentiable on $\mathbb{R}_+$. Moreover, this disclosure can adopt the weighted-α fairness with respect to flow incoming rates. The utility functions can be given as follows: for all $f\in F$, if $\alpha>0$, $U_f(\lambda_f)=w_f\lambda_f^{1-\alpha}/(1-\alpha)$, if $\alpha=1$, $U_f(\lambda_f)=w_f\log \lambda_f$, where $w_f$ can be a positive weighting factor and can be different for different flows.

Next, this disclosure investigates the functionality design of flow routing. $z_f^{(i,j)}(t)\geq 0$ can denote the data rate offered for flow f in link (i,j) at time t and $\lambda_f=\lim_{T\to\infty}\Sigma_{t=0}^{T-1}\lambda_f(t)/T$. The constraints of flow conservation can then be obtained as $$\sum_{j\in\mathcal{N}_i} \left[z_f^{(i,j)} - z_f^{(j,i)}\right] \geq \lambda_f \mathbb{1}_{\{i=s_f\}}, \forall i \neq d_f, f \in F \quad (3)$$

where $s_f$ and $d_f$ denote the source and destination of flow f, respectively. This can indicate that for each flow and node except the flow destination, the net flow into the node can be (or should be) no lesser than the external inflow at that node. Also, regarding link capacities, the constraints that total flow rates in each link can be (or should be) less than or equal to the link capacity can be given as $$\sum_{f\in F} z_f^{(j,i)}(t) \leq \mu^{(j,i)}(t), \forall (j,i) \in \mathcal{L}_{AU}, i \in \mathcal{B} \quad (4a)$$

$$\sum_{f\in F} z_f^{(i,j)}(t) \leq \mu^{(i,j)}, \forall (i,j) \in \mathcal{L}_C \quad (4b)$$

$$\sum_{f\in F} z_f^{(i,j)}(t) \leq \mu^{(i,j)}(p^{ij}(t)), \forall i \in \mathcal{B}, (i,j) \in \mathcal{L}_{AD} \quad (4c)$$

where Eqs. (4a)-(4c) are for wireless uplinks, wired links, and wireless downlinks, respectively. Note that Eqs. (3)-(4c) together define the network capacity region as the largest set of incoming flow rates $\{\lambda_f, f\in F\}$ such that a routing policy exists while guaranteeing these constraints.

Finally, the flow scheduling is designed. Assume that each node maintains a flow queue for each data flow, where $Q_f^i(t)\geq 0$ denotes the amount of data packets of flow f in node i at time t. Let $Q_f^{d_f}(t)=0$, $\forall t$, as data flows leave the network once reaching their destinations. The following equations show the queue evolution as $$Q_f^i(t+1)=[Q_f^i(t)-\Sigma_{j\in\mathcal{N}_i}\hat{z}_f^{(i,j)}(t)]^+ + \Sigma_{j\in\mathcal{N}_i}\hat{z}_f^{(j,i)}(t)+\lambda_f(t)\mathbb{1}_{\{i=s_f\}}, \forall i\neq d_f, f\in F,$$

where $[\cdot]^+ \triangleq \max\{\cdot,0\}$ and $\hat{z}_f^{(j,i)}(t)\leq z_f^{(j,i)}(t)$ denotes the actual routing rate. Moreover, to support congestion-free networks, the disclosed systems and methods can adopt the following notion of queue-stability.

In particular, the system can be stable (congestion-free) if the average queue lengths are bounded, e.g., $$\mathbb{E}[Q_f^i(t)]<\infty, \forall i\neq d_f, f\in F. \quad (5)$$

B. Optimization Problem of the Network Virtualization

So far, the disclosed systems and methods have characterized many functionalities. To realize an utility-optimal virtualization, this disclosure aims to improve or maximize the total utility while satisfying system constraints by jointly improving or optimizing congestion control, flow routing, and power slicing. The end-to-end network problem can be defined as follows.

Definition 1. Utility-Optimal Network Virtualization Problem.

Given a software-defined cellular architecture with set $\mathcal{B}$ of BBS 103b, 103c, link set $\mathcal{L}$, data flow set F, and N nodes, the problem can be formulated as Find: $\lambda_f(t) \geq 0$, $z_f^{(i,j)}(t) \geq 0$, $\forall\,(i, j) \in \mathcal{L}$, $f \in F$ (6)

$p_{ij}(t) \geq 0$, $\forall\, i \in B$, $(i, j) \in \mathcal{L}_{AD}$

Maximize $\sum_{f \in F} U_f(\lambda_f)$

Subject to (2), (3), (4a), (4b), (4c), (5)

This problem jointly studies end-to-end, fine-grained, and dynamic resource slicing in software-defined infrastructure.

C. Problem Transformation for Optimal Designs

To solve the stochastic optimization problem in Eq. (6), one can resort to the corresponding deterministic problem in terms of average values $\lambda_f$, $z_f^{(i,j)}$, $$p_{ij} = \lim_{T \to \infty} \sum_{t=0}^{T-1} p^{ij}(t)/T,$$

and $\mu^{(i,j)}$ (for wireless uplink via the assumption of fixed $p^{ul}$; for wireless downlink via average $p^{ij}$). The idea follows that even though the real random values can vary with time, they typically stay close to the attractors, which are the enhanced or optimal solutions of the deterministic optimization problem. Hence, given the following, one can transform the original virtualization problem into its deterministic matrix formulation to enable usage of advanced optimization techniques.

First, one can reconsider the flow conservation constraints with node-arc incidence matrices. Let tx(l) and rx(l) be the transmitting and receiving nodes of link l, respectively, and $z_f \triangleq [z_f^1, \ldots, z_f^{|\mathcal{L}|}]^T$ by arranging $z_f^{(i,j)}$ in a link-based order. For each flow $f \in F$, one can define $M_f = [m_f^1, \ldots, m_f^{|\mathcal{L}|}] \in \mathbb{R}^{(N-1) \times |\mathcal{L}|}$ and source vector $b_f \in \mathbb{R}^{N-1}$ by $$(m_f^l)_n = \begin{cases} 1 & \text{if } n = tx(l), \\ -1 & \text{if } n = rx(l), \\ 0 & \text{otherwise}; \end{cases} \quad (b_f)_n = \begin{cases} 1 & \text{if } n = s_f, \\ 0 & \text{otherwise}, \end{cases}$$

where $n \neq d_f$. Accordingly, Eq. (3) can be rewritten as $M_f z_f - \lambda_f b_f \geq 0$, $\forall f \in \mathcal{F}$. Next, one can set $B = \text{Diag}(b_1, \ldots, b_F)$, $M^l = \text{Diag}(-m_1^l, \ldots, -m_F^l)$, $\forall l \in \mathcal{L}$, and $\mathcal{L}_{AD} \triangleq \mathcal{L}_{AD}^1 \cup \ldots \cup \mathcal{L}_{AD}^{|B|}$, where $\mathcal{L}_{AD}^i$ denotes the downlink set under BBS 103b i. One has matrix A as $$A \triangleq \begin{bmatrix} B & M^1 \ldots M^{|\mathcal{L}|} & & \\ & & 1_{|\mathcal{L}_{AD}^1|}^T & \\ & & & \ddots \\ & & & & 1_{|\mathcal{L}_{AD}^{|B|}|}^T \end{bmatrix}$$

to include topological information. One can further use vector x to represent policies of congestion control, flow routing, and power slicing, as $x \triangleq [\lambda_1, \ldots, \lambda_F, z_1^1, \ldots, z_F^1, \ldots z_1^{|\mathcal{L}|}, \ldots, z_F^{|\mathcal{L}|}, p^1, \ldots, p^{|\mathcal{L}_{AD}|}]^T$ arranged in the link-based order.

With $c \triangleq [0_{(N-1)F}^T, P^{max} 1_{|B|}^T]^T$, one can combine the constraints of flow conservation in Eq. (3) and power slicing in Eq. (2) into a compact inequality as $Ax \leq c$. Finally, one can define the following $\epsilon$-scaled barrier objective function as $$\hat{g}(x) = -\sum_{f \in F} U_f(\lambda_f) - \quad (7)$$

$$\epsilon \left[ \sum_{l \in \mathcal{L}_{AU} \cup \mathcal{L}_C} \log\left(\mu^l - \sum_{f \in F} z_f^l\right) + \sum_{l \in \mathcal{L}_{AD}} \log\left(\mu^l(p^l) - \sum_{f \in F} z_f^l\right) + \sum_{f \in F} \log \lambda_f + \sum_{f \in F} \sum_{l \in \mathcal{L}} \log z_f^l + \sum_{l \in \mathcal{L}_{AD}} \log p^l \right],$$

where $\epsilon > 0$ is the barrier parameter from interior-point methods. Hence, the original stochastic problem in Eq. (6) can be transformed into the deterministic problem as Find: $x = [\{\lambda_f, z_f^l; \forall\, l \in \mathcal{L}, f \in F\}, \{p^l; \forall\, l \in \mathcal{L}_{AD}\}]$ (8)

Minimze $g(x)$

Subject to $Ax - c \leq 0$

Note that when the constraint in Eq. (8) is met, the queue-stability in Eq. (5) can be satisfied.

Fast Network Resource Slicing (FNRS) Via Second-Order Distributed Methods

Aiming at solving the virtualization problem, this disclosure describes a procedure including an FNRS algorithm that can yield enhanced or optimal communication functionalities in a fast manner. Specifically, a primal-dual Newton's method can be exploited, which can improve or maximize the total utility in second-order speed by orchestrating control units 103 (e.g., high-level network controllers 103a, BBSs 103b, and/or BBSs 103c), with jointly improved or optimized congestion control, flow routing, and power slicing.

A. Perturbed KKT System and Newton's Method

Given the problem formulation in Eq. (8), this disclosure introduces a perturbed Karush-Kuhn-Tucker (KKT) system from primal-dual interior-point methods. The barrier objective function can be defined as $$\hat{g}(x) = -\sum_{f \in F} U_f(\lambda_f) - \quad (9)$$

$$\epsilon \left[ \sum_{l \in \mathcal{L}_{AU} \cup \mathcal{L}_C} \log\left(\mu^l - \sum_{f \in F} z_f^l\right) + \sum_{l \in \mathcal{L}_{AD}} \log\left(\mu^l(p^l) - \sum_{f \in F} z_f^l\right) + \sum_{f \in F} \log \lambda_f + \sum_{f \in F} \sum_{l \in \mathcal{L}} \log z_f^l + \sum_{l \in \mathcal{L}_{AD}} \log p^l \right],$$

and introduce dual vectors $\hat{y}[\hat{y}_1^T, \ldots, \hat{y}_F^T, \hat{y}_1^P, \ldots, \hat{y}_{|B|}^P]^T$ and $y = \hat{y}/\llcorner$, which satisfy $-\hat{y}^T \text{Diag}(Ax-c) = \epsilon 1^T$. As $\epsilon \to 0$, the system almost reaches its optimality, since the perturbed KKT point $(x, \hat{y})$ nearly satisfies KKT conditions. Then, with scaled point $(x,y)$, one can formulate the $\epsilon$-scaled perturbed KKT system as follows:

$(\nabla_x g(x))^T + y^T A = 0^T$ (10a)

$-y^T \text{Diag}(Ax-c) = 1^T$ (10b)

$x > 0, Ax < c$ (10c)

$y > 0.$ (10d)

To this end, one can apply the primal-dual Newton's method, which can start from initial feasible solution $(x^0, y^0)$ and iteratively search new feasible solutions by $$\begin{bmatrix} x^{m+1} \\ y^{m+1} \end{bmatrix} = \left( \begin{bmatrix} x^m \\ y^m \end{bmatrix} + \delta \begin{bmatrix} \Delta x^m \\ \Delta y^m \end{bmatrix} \right)_\Phi, m \geq 0 \quad (11)$$

where $\delta \in (0,1]$ denotes the constant step-size, $(\cdot)_\Phi$ denotes the projection onto the set $\Phi$, and $\Delta x^m$ and $\Delta y^m$ denote the primal and dual Newton directions, respectively. First, the step-size selection facilitates the superlinear or quadratic convergence speed, and can be performed by concurrently satisfying the primal-dual feasibilities of new solutions and a decreasing residual from the KKT conditions.

$$\Phi \triangleq \left\{ (x, y) \middle| \begin{array}{c} \phi_2 1 \geq x \geq \phi_1 1, Ax \leq c - \phi_1 1 \\ y \geq \phi_1 \end{array} \right\}, \quad (12)$$

where the constant $\phi_1 > 0$ can be set arbitrarily close to zero and the constant $\phi_2 > 0$ can be used for burstiness reduction. Second, the primal and dual Newton directions can be derived by using the Newton's method for root-finding as follows:

$$\begin{bmatrix} W^m & A^T \\ -\Gamma^m A & -\Psi^m \end{bmatrix} \begin{bmatrix} \Delta x^m \\ \Delta y^m \end{bmatrix} = \begin{bmatrix} -\Xi^m - A^T y^m \\ \Psi^m y^m + 1 \end{bmatrix} \quad (13)$$

where $W^m \triangleq \nabla_x^2 g(x^m)$, $\Xi^m \triangleq \nabla_x g(x^m)$, $\Gamma^m \triangleq \text{Diag}(y^m)$, and $\Psi^m \triangleq \text{Diag}(Ax^m - c)$. Due to the complex structure of Eq. (13), different from the one by classical Newton's methods, it can be unfavorable to solve Eq. (13) directly. One can work on a set of reduced linear equations by Gaussian elimination. For the primal direction, $$\Delta x^m = -(W^m)^{-1}[\Xi^m + A^T(y^m + \Delta y^m)]. \quad (14)$$

For the dual direction, one can introduce auxiliary vector $\tilde{y}^{m+1} \triangleq y^m + \Delta y^m$ and obtain the following equation as $$\Sigma^m \tilde{y}^{m+1} = -A(W^m)^{-1} \Xi^m + (\Gamma^m)^{-1} 1, \quad (15)$$

where $\Sigma^m \triangleq A(W^m)^{-1} A^T - (\Gamma^m)^{-1} \Psi^m$.

B. The Fast Network Resource Slicing Algorithm

Until now, this disclosure has derived many components of the disclosed second-order technique. FIG. 2A summarizes the disclosed procedure 200 which can include a primal-dual iterative FNRS method (e.g., Algorithm 1 or FNRS algorithm). The steps can include:

---
Input : Utility-optimal problem in Eq. (6) and $\in > 0$
Output: $\lambda_f^*$, $z_f^{l*}$, $\forall f \in F, l \in \mathcal{L}$ ; $p^{l*}$, $\forall l \in \mathcal{L}_{AD}$.
1  set initial values for $\lambda_f$, $z_f^l$, $y_f^{-i}$, $\forall i \neq d_f$, $f \in F, l \in \mathcal{L}$ ;
   $p^l$, $\forall l \in \mathcal{L}_{AD}$, $y_i^{-P}$, $\forall i \in \mathcal{B}$ . %Initialization
2  do
3  |   compute $\tilde{y}^{m+1}$ using Eq. (15).
4  |   obtain $\Delta y^m = \tilde{y}^{m+1} - y^m$ and $\Delta x^m$ via Eq.
   |   (14).
5  |   update $x^{m+1}$ and $y^{m+1}$ jointly via Eq. (11).
6  while a predefined runtime is not reached or the
   Newton decrement criterion is not satisfied;
---

In the procedure 200 with a given $\in$, Step 1 can initialize the algorithm, Steps 3 and 4 can calculate the auxiliary dual vector and the primal and dual Newton directions, and Step 5 can compute the primal and duate updates. Step 6 can give the stopping criterion for the main iteration and completes the procedure 200. The following provides the rigid performance analysis for the disclosed FNRS algorithm. Specifically, the queue stability and the utility optimality of Algorithm 1 is analyzed.

Theorem 1: (The Queue Stability of FNRS). Consider Algorithm 1 and a given barrier parameter $\epsilon > 0$. One has $\lim \sup_{t \to \infty} \mathbb{E}[\|Q(t)\|] = O(1/\epsilon)$. Also, consider the utility optimality in Theorem 2.

Theorem 2: (The Utility Optimality of FNRS). Let $x^*$ denote the optimal average-rate solution to the utility-optimal virtualization problem. Consider Algorithm 1 and a given $\epsilon > 0$. If step-size $\delta$ Scales as $O(\epsilon)$, then $\lim \sup_{T \to \infty} \|[\sum_{t=0}^{T-1} x(t) - x^*]/T\| = O(\sqrt{\epsilon})$. For x outside of $[x^* - \sqrt{\epsilon} K, x^* + \sqrt{\epsilon} K]$, the convergence rate to drive x inside this interval can be lower-bounded by $$\mathcal{R} = \frac{eig_{min}(W)}{eig_{min}(W - A^{T\Psi^{-1}\Gamma A})} \geq 1,$$

and $\mathcal{R} \to 1$ as $\epsilon \to 0$. Let $$x^\infty \triangleq \lim sup_{T \to \infty} \frac{1}{T} \sum_{t=0}^{T-1} x(t).$$

One also has the following with target utility $U(x^*)$: $U(x^*) - U(x^\infty) = O(\epsilon)$.

Remark: Theorem 1 indicates that the disclosed procedure 200 including the FNRS algorithm can guarantee flow queues with bounded queue-lengths, which in turn can ensure a congestion-free system. Theorem 2 further validates the fast convergence and the utility and design optimality of the FNRS algorithm. In addition, signaling overheads can be reduced or eliminated via coordination of the control units 103, e.g., the hierarchical structure of network controllers 103a, BBSs 103b, and/or BBSs 103c. Hence, the disclosed procedure 200 can achieve enhanced or optimal (steady-state) solutions and expedite the practical virtualization implementation in enterprise and campus networks.

Numerical Results

In this section, numerical studies evaluate the performance achieved by the disclosed fast network slicing. As shown in FIG. 2B, one can consider an architecture that comprises an uplink and a downlink SD-RAN with two UEs 112, respectively, and an SD-CN with seven nodes. According to this example of the disclosure, there are three data sessions (end-to-end flows) in this system: session 1 from a sending UE 112, node 1, node 5, to a receiving UE 112 with utility function $0.5 \log(\lambda_1)$, session 2 from a sending UE 112, node 1, to node 6 with $\log(\lambda_2)$, and session 3 from node 7, node 5, to a receiving UE 112 with $1.5 \log(\lambda_2)$ the log utilities are widely adopted for the proportional fairness. Each link in the uplink SD-RAN and SD-CN has unit capacity. The downlink BBS 103b has unit transmit power with $\sigma^2 = 1$ and $[|h_1^{dlH}(t)h_1^{dl}(t)|^2, |h_2^{dlH}(t)h_2^{dl}(t)|^2] = [1.7, 1.2]$. Also, $\epsilon = 0.001$ indicates that the E-scaled perturbed complementary slackness in Eq. (10a) has the accuracy on the order of $10^{-3}$.

Figure 3:
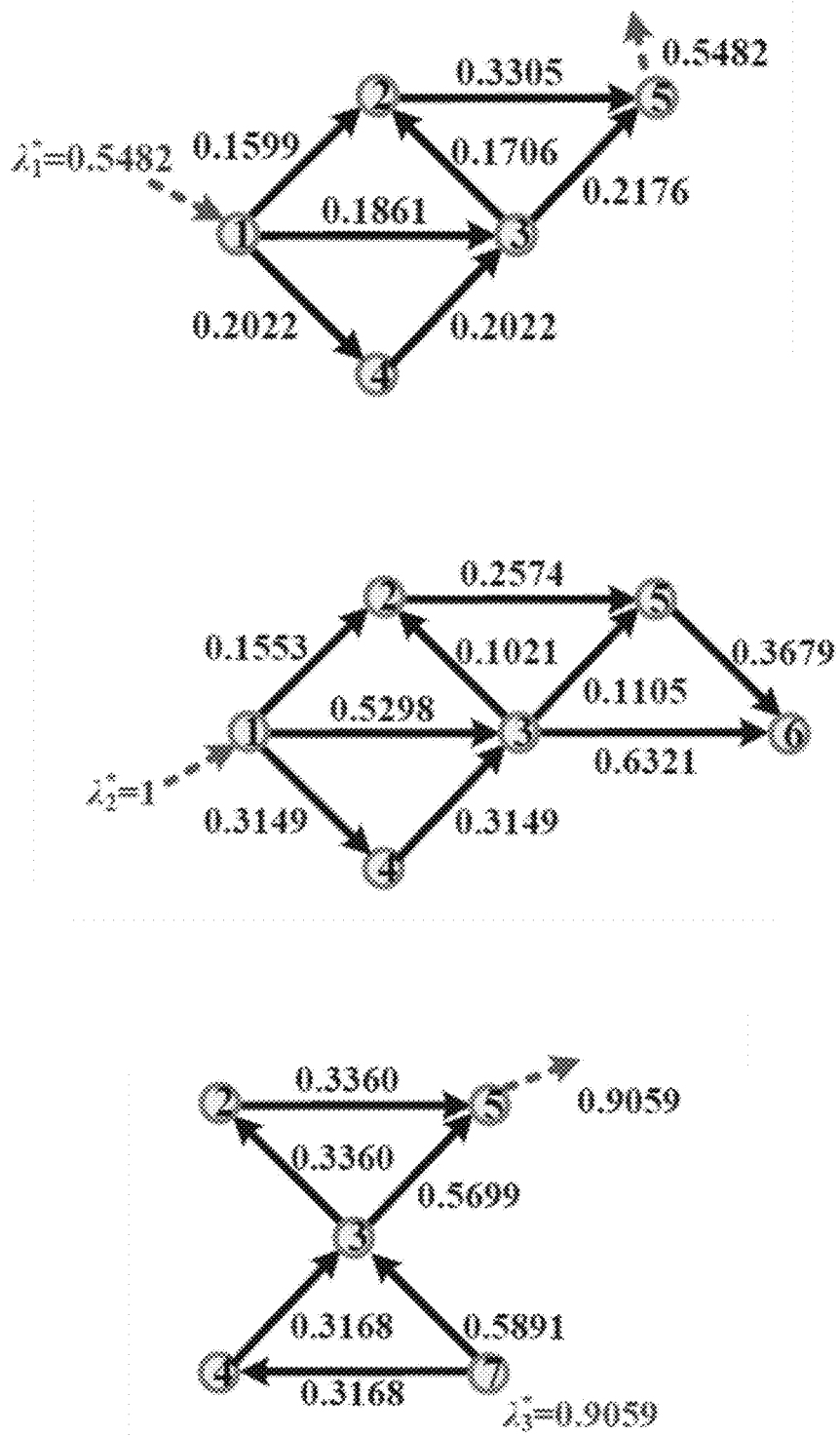
FIG. 3 shows enhanced or optimal source rates and routing solutions of three sessions for the setup in FIG. 2B according to various embodiments of the present disclosure.

FIG. 3 provides the enhanced or optimal source and link rate for each of three sessions for the setup shown in FIG.

Figure 4:
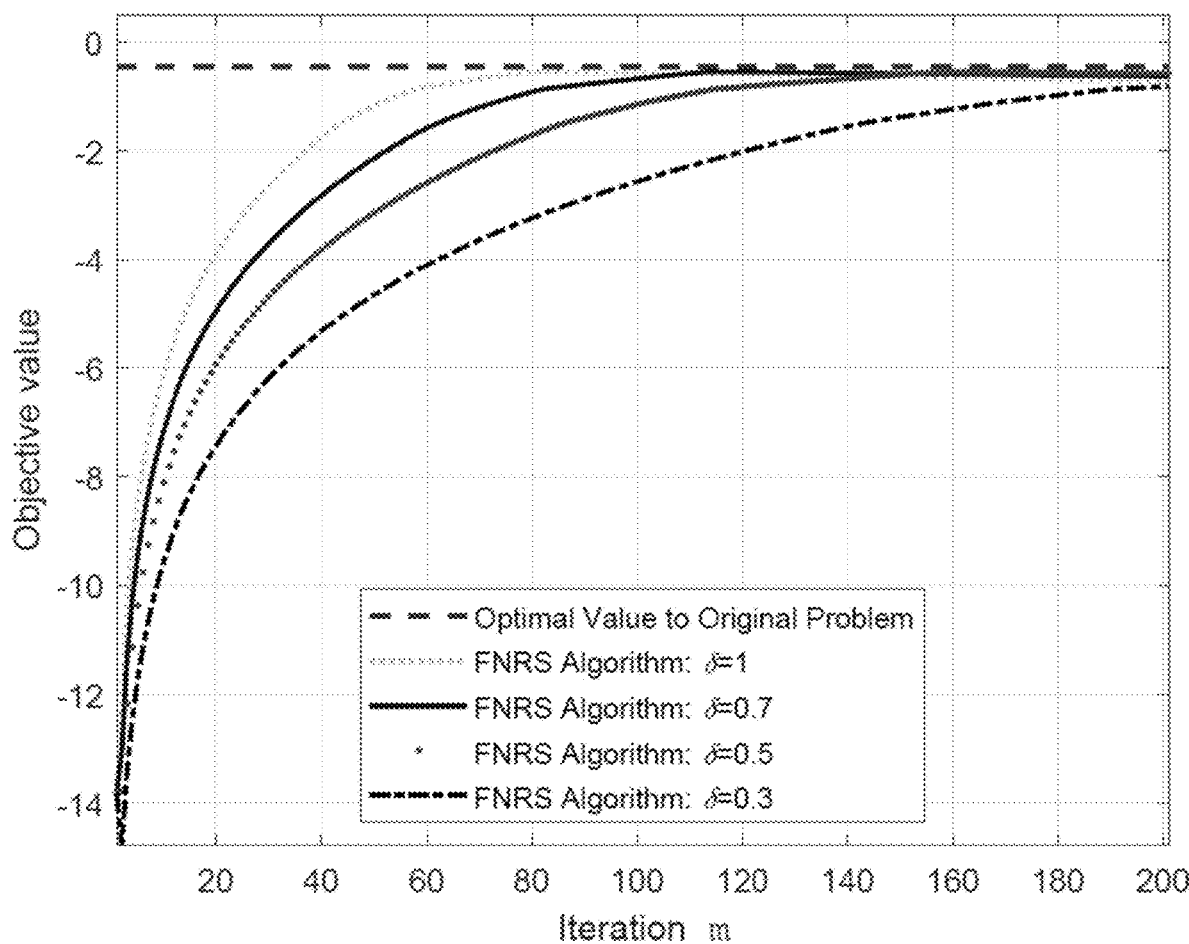
FIG. 4 shows a graph illustrating convergence behaviors of the FNRS with different step-sizes according to various embodiments of the present disclosure.

2B, where $[p^{1*}, p^{2*}]=[0.2719, 0.7281]$. To illustrate the fast convergence of the procedure 200 including Algorithm 1, FIG. 4 shows the convergence behavior of the procedure 200 including FNRS with respect to different (constant) step-sizes δ. The results imply that with larger step-sizes, the objective values yielded by the disclosed procedure 200 and/or FNRS can converge rapidly to the optimal one, while the primal-dual feasibility can be satisfied by the projection in Eq. (12). Particularly, δ=1 means that FNRS can take a full Newton step in each iteration and can converge very fast in approximately 80 iterations. This demonstrates the efficiency of the disclosed solution that quickly and jointly achieves optimal policies to congestion control, flow routing, and power slicing.

Figure 5A:
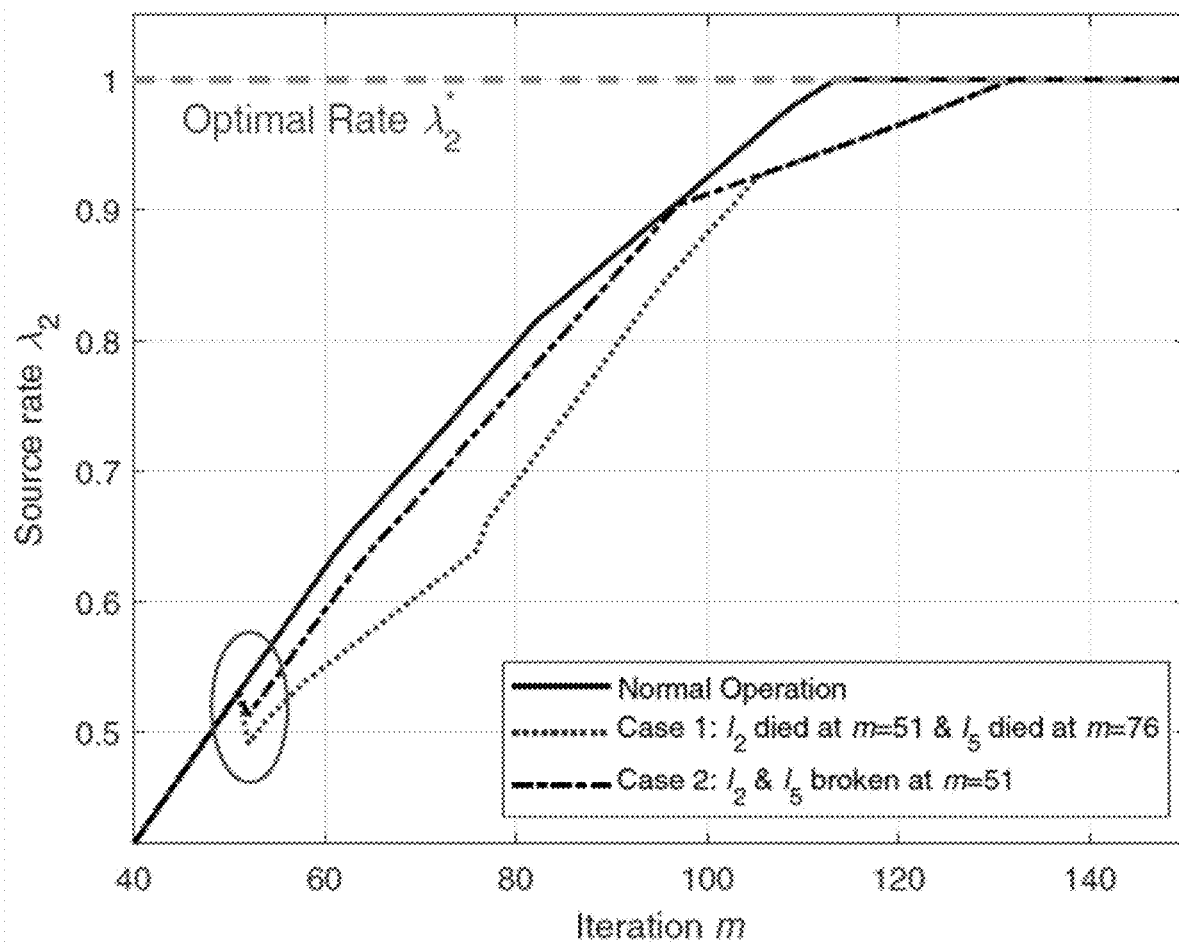
FIG. 5A shows a graph illustrating convergence performance of the FNRS under operation according to various embodiments of the present disclosure.
Figure 5B:
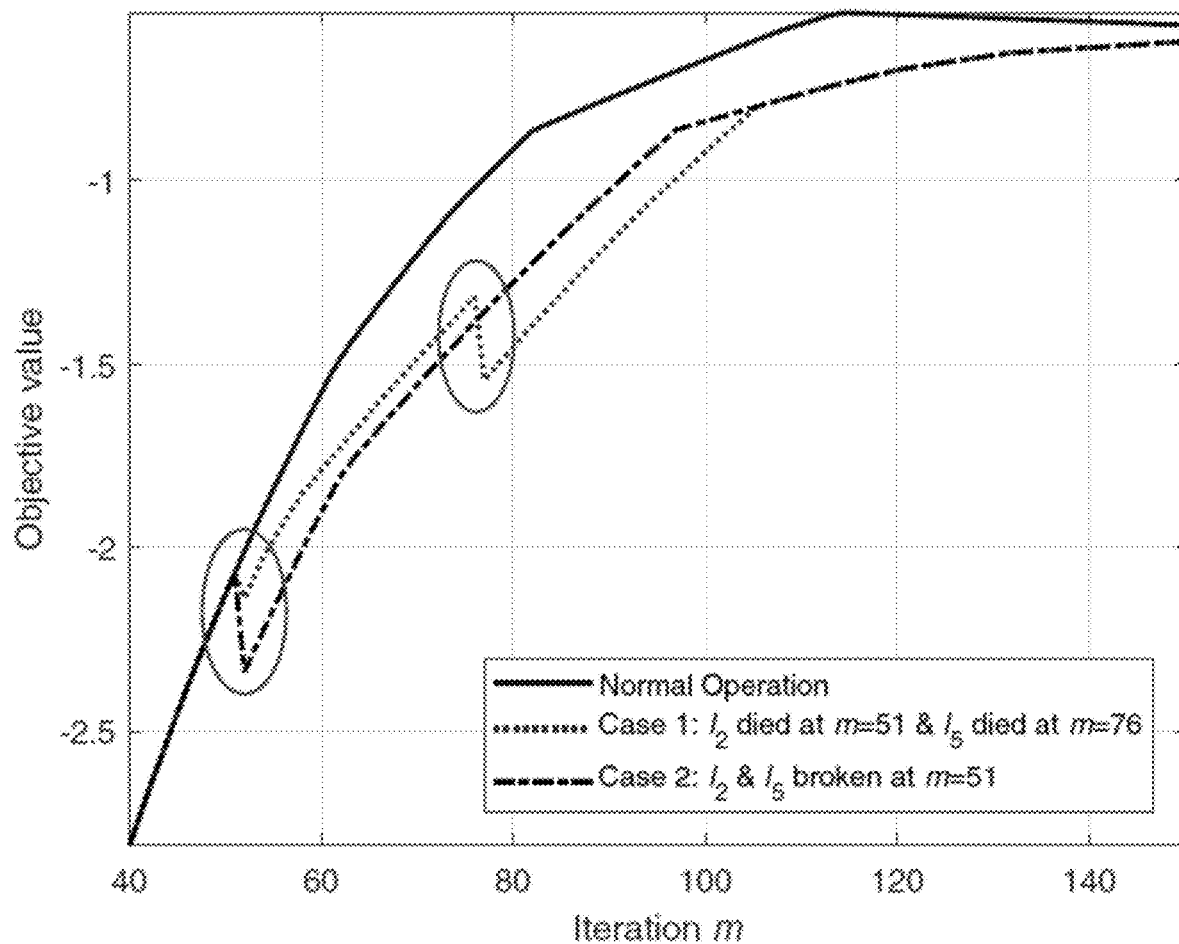
FIG. 5B shows a graph illustrating convergence performance of the FNRS under link failure cases according to various embodiments of the present disclosure.

To further evaluate the adaptiveness of the disclosed slicing algorithm, the impacts of time-varying network topology due to link failures are investigated. By executing FNRS with δ=0.7, FIGS. 5A and 5B show the convergence performance in source rate $\lambda_2$ (FIG. 5A) and the objective value (FIG. 5B), under example or normal operation and two undesired cases. Case 1 as shown in FIGS. 5A and 5B has link $l_2$ and $l_5$ died at iteration 51 and 76, respectively, and Case 2 as shown in FIGS. 5A and 5B has both links broken at iteration 51. Particularly, for the example or normal operation shown in FIGS. 5A and 5B, the FNRS converges in 114 iterations; even for the undesirable cases shown in FIGS. 5A and 5B, it can achieve enhanced or optimal values after 150 iterations, regardless of performance drops from link failures during the convergence phase.

Figure 6:
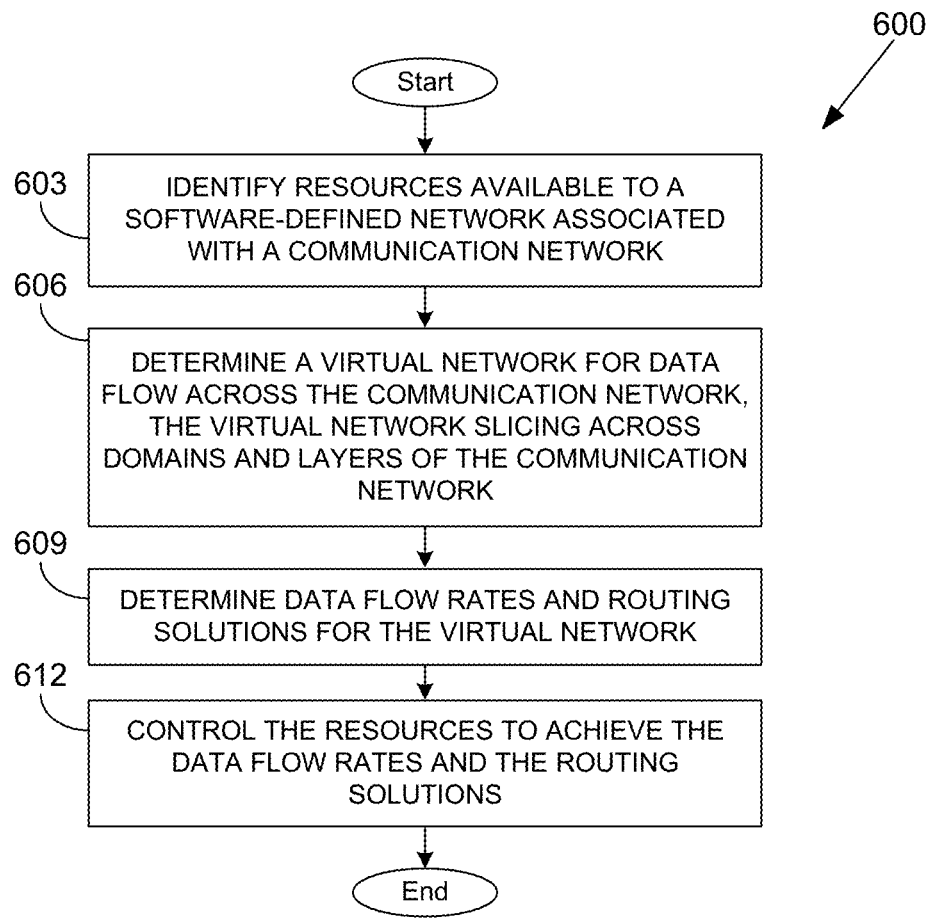
FIG. 6 illustrates an example flowchart of certain functionality implemented by portions of the end-to-end virtualization framework of FIG. 1 according to various embodiments of the present disclosure.

Referring next to FIG. 6, shown is a flowchart that provides one example of the operation of a process 600 according to various embodiments. It is understood that the flowchart of FIG. 6 provides merely an example of the many different types of functional arrangements that may be employed to implement the operation of the portion of the end-to-end virtualization framework 100 as described herein. As an alternative, the flowchart of FIG. 6 may be viewed as depicting an example of elements of a method implemented in the an end-to-end virtualization framework 100 (FIG. 1) according to one or more embodiments.

At box 603, the process 600 can include identifying resources (e.g., wired resources and wireless resources) available to a software-defined network associated with a communication network. For example, the resources can comprise N nodes, including one or more UEs 112, one or more control units 103, and one or more SD-Switches 106. The control units 103 can include a network controller 103a and a set B of BBSs 103b, 103c.

At box 606, the process 600 can include determining at least one virtual network for data flow across the communication network. The data flow in this context can refer to an end-to-end flow depicted in the end-to-end virtualization framework 100 of FIG. 1. Data flow across the communication network can include incoming flows from wired resources associated with the network controllers 103a and wireless resources associated with the BBSs 103b. The virtual network can slice across domains and layers of the communication network. In some examples, the virtual network slices across a plurality of domains comprising the wired resources and the wireless resources. Additionally, the virtual network can slice across layers (e.g., physical, media access control, or network) of the software-defined network and/or the communication network. In some aspects, the virtual network can be determined based upon convergence within a predetermined number of iterations of an iterative optimization problem in which each iteration comprises a quadratic objective for utility of the at least one virtual network.

At box 609, the process 600 can include determining data flow rates and/or routing solutions for the at least one virtual network to realize a total data flow rate comprising incoming flows from the wired and the wireless resources. In some examples, the data flow rate offered for a flow f in a link (i,j) at time t and $\lambda_f = \lim_{T \to \infty} \Sigma_{t=0}^{T-1} \lambda_f(t)/T$ is determined. The process 600 can determine the largest set of incoming flow rates $\{\lambda_f, f \in F\}$ such that a routing policy exists according to at least one constraint.

At box 612, the process 600 can include controlling the resources to achieve the data flow rates and routing solutions. For example, the process 600 can control at least one control unit 103 comprising a controller 103a, a BBS 103b, and/or a BBS 103c to provide congestion control, flow routing, and power slicing in wired and wireless network resources associated with the control unit 103. Thereafter the process can proceed to completion.

Figure 7:
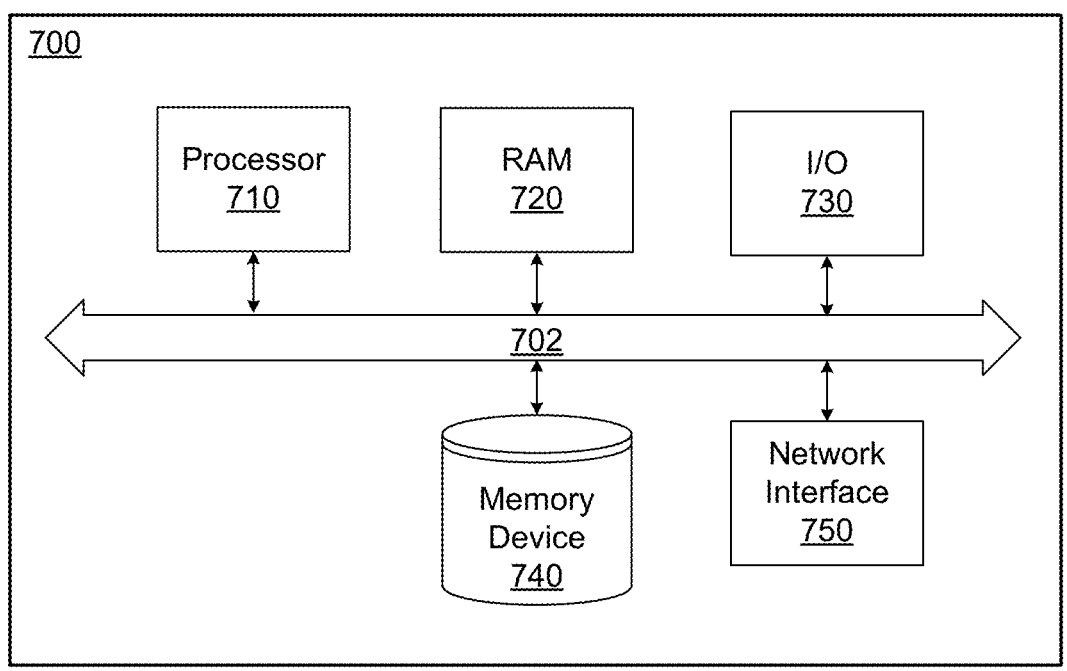
FIG. 7 is a schematic block diagram that illustrates an example computing environment employed in the end-to-end virtualization framework of FIG. 1 according to various embodiments of the present disclosure.

Turning to FIG. 7, an example hardware diagram of a general purpose computer 700 is illustrated. Any of the processes, techniques, and methods discussed herein may be implemented, in part, using one or more elements of the general purpose computer 700. The computer 700 includes a processor 710, a Random Access Memory ("RAM")/a Read Only Memory ("ROM") 720, an Input Output ("I/O") interface 730, a memory device 740, and a network interface 750. The elements of the computer 700 are communicatively coupled via a bus 703.

The processor 710 comprises any known general purpose arithmetic processor or Application Specific Integrated Circuit ("ASIC"). The RAM/ROM 720 comprise any known random access or read only memory device that stores computer-readable instructions to be executed by the processor 710. The memory device 740 stores computer-readable instructions thereon that, when executed by the processor 710, direct the processor 710 to execute various aspects of the present disclosure described herein. When the processor 710 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 740 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 750 comprises hardware interfaces to communicate over data networks. The I/O interface 730 comprises device input and output interfaces such as keyboard, pointing device, display, communication, and other interfaces. The bus 703 electrically and communicatively couples the processor 710, the RAM/ROM 720, the I/O interface 730, the memory device 740, and the network interface 750 so that data and instructions may be communicated among them.

In operation, the processor 710 is configured to retrieve at least one application comprising computer-readable instructions stored on the memory device 740, the RAM/ROM 720 or another storage means, and copy the computer-readable instructions to the RAM/ROM 720 for execution, for example. The processor 710 is further configured to execute the computer-readable instructions to implement various aspects and features of the present disclosure. For example, the processor 710 may be adapted and configured to execute the processes described above, including the processes described as being performed as part of an end-to-end virtualization framework 100, an FNRS algorithm, or a software-defined network (SDN). Also, the memory device 740 may store data about constraints, identification data for the SDN, or for resources associated with the SDN including the controller 103a, the BBS 103b, the BBS 103c, the SD-Switch 106, the RRH 109, the UE 112, or the antennas of the RRH 109. The memory device 740 may also store any other data suitable for operation of the end-to-end virtualization framework 100.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, one or more applications described herein can execute in the same computing device, or in multiple computing devices.

It should be emphasized that the described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method for providing fast network resource slicing (FNRS), comprising:

identifying control units of a software defined cellular architecture associated with a communication network, the control units comprising network controllers and baseband servers (BBSs);

determining at least one virtual network for data flow across the communication network, where the at least one virtual network slices across domains and across layers of the communication network, where the at least one virtual network is determined based upon convergence within a predetermined number of iterations of an iterative optimization problem in which each iteration comprises a quadratic objective for utility of the at least one virtual network;

determining data flow rates and routing solutions for the at least one virtual network to realize a total data flow rate comprising incoming flows from wired resources associated with the network controllers and incoming flows from wireless resources associated with the BBSs; and controlling the control units to achieve the data flow rates and routing solutions.

2. The method of claim 1, wherein controlling the control units achieves flow queues with bounded queue lengths.

3. The method of claim 1, wherein the iterative optimization problem further comprises at least one of: a linear constraint for congestion control of the at least one virtual network, a linear constraint for flow routing of the at least one virtual network, a linear constraint for flow scheduling of the at least one virtual network, a linear constraint for power slicing of the BBSs, or a linear constraint for flow scheduling.

4. The method of claim 3, wherein the linear constraint for flow routing comprises individual constraints for wireless uplinks, wired links, and wireless downlinks associated with the data flow.

5. The method of claim 1, further comprising:
providing slices of transmit power for power utilization of the BBSs.

6. The method of claim 1, wherein the software defined cellular architecture comprises a SoftAir architecture.

7. The method of claim 1, wherein each of the BBSs control one or more remote radio heads (RRHs) comprising at least eight antennas.

8. A system for providing fast network resource slicing (FNRS), comprising:

at least one computing device coupled to a network;

at least one application executable in the at least one computing device, the at least one application causing the at least one computing device to:

identify wired and wireless resources associated with a communication network;

determine at least one virtual network for data flow across the communication network, where the at least one virtual network slices across the wired and the wireless resources of the communication network, where the at least one virtual network is determined based upon convergence within a predetermined number of iterations of an iterative optimization problem in which each iteration comprises a quadratic objective for utility of the at least one virtual network;

determine data flow rates and routing solutions for the at least one virtual network to realize a total data flow rate comprising incoming flows from the wired and the wireless resources; and control the wired and the wireless resources to achieve the data flow rates and routing solutions.

9. The system of claim 8, wherein controlling the wired and the wireless resources achieves flow queues with bounded queue lengths.

10. The system of claim 8, wherein the iterative optimization problem further comprises at least one of: a linear constraint for congestion control of the at least one virtual network, a linear constraint for flow routing of the at least one virtual network, a linear constraint for power slicing of the wireless resources, or a linear constraint for flow scheduling.

11. The system of claim 10, wherein the linear constraint for flow routing comprises individual constraints for wireless uplinks, wired links, and wireless downlinks.

12. The system of claim 8, wherein the at least one application further causes the at least one computing device to:
provide slices of transmit power for power utilization of the wireless resources.

13. The system of claim 8, wherein at least one of the wired resources comprises a network controller, and at least one of the wireless resources comprises a baseband server.

14. The system of claim 13, wherein the incoming flows from the wired and the wireless resources comprise incoming flows from wired resources associated with the network controller, and incoming flows from wireless resources associated with the baseband server.

15. A non-transitory computer-readable medium embodying program instructions executable in at least one computing device that, when executed by the at least one computing device, cause the at least one computing device to:
identify wired and wireless resources associated with a communication network;
determine at least one virtual network for data flow across the communication network, where the at least one virtual network slices across the wired and the wireless resources of the communication network, where the at least one virtual network is determined based upon convergence within a predetermined number of iterations of an iterative optimization problem in which each iteration comprises a quadratic objective for utility of the at least one virtual network;
determine data flow rates and routing solutions for the at least one virtual network to realize a total data flow rate comprising incoming flows from the wired and the wireless resources; and
control the wired and the wireless resources to achieve the data flow rates and routing solutions.

16. The non-transitory computer readable medium of claim 15, wherein controlling the wired and the wireless resources achieves flow queues with bounded queue lengths.

17. The non-transitory computer readable medium of claim 15, wherein the iterative optimization problem further comprises at least one of: a linear constraint for congestion control of the at least one virtual network, a linear constraint for flow routing of the at least one virtual network, a linear constraint for power slicing of the wireless resources, or a linear constraint for flow scheduling.

18. The non-transitory computer readable medium of claim 17, wherein the linear constraint for flow routing comprises individual constraints for wireless uplinks, wired links, and wireless downlinks associated with the data flow.

19. The non-transitory computer readable medium of claim 15, wherein the instructions, when executed by the at least one computing device further cause the at least one computing device to:
provide slices of transmit power for power utilization of the wireless resources.

20. The non-transitory computer readable medium of claim 15, wherein at least one of the wired resources comprises a network controller, and at least one of the wireless resources comprises a baseband server.

* * * * *